(12) United States Patent
Dai et al.

(10) Patent No.: US 11,983,524 B2
(45) Date of Patent: May 14, 2024

(54) AUTOMATED UPGRADE IN DISTRIBUTED COMPUTING ENVIRONMENTS

(71) Applicant: Confluent, Inc., Mountain View, CA (US)

(72) Inventors: Decheng Dai, Fremont, CA (US); Ziyang Wang, Redmond, WA (US); Rashmi Prabhu, Los Altos Hills, CA (US); Subramanian Ganapathy, Mountain View, CA (US); Chaoqun Chen, Mountain View, CA (US); Aashish Kohli, San Carlos, CA (US); Gaurav Gargate, Menlo Park, CA (US); Vaibhav Pravin Desai, Fremont, CA (US)

(73) Assignee: Confluent, Inc., Mountain View, CA (US)

( * ) Notice: Subject to any disclaimer, the term of this patent is extended or adjusted under 35 U.S.C. 154(b) by 104 days.

(21) Appl. No.: 17/709,024

(22) Filed: Mar. 30, 2022

(65) Prior Publication Data

US 2023/0315422 A1    Oct. 5, 2023

(51) Int. Cl.
*G06F 8/65* (2018.01)
*G06F 9/50* (2006.01)
*G06F 11/34* (2006.01)

(52) U.S. Cl.
CPC ............ *G06F 8/65* (2013.01); *G06F 9/5072* (2013.01); *G06F 9/5077* (2013.01); *G06F 11/3409* (2013.01); *G06F 2209/505* (2013.01)

(58) Field of Classification Search
CPC ........ G06F 8/65; G06F 9/5072; G06F 9/5077; G06F 11/3409; G06F 2209/505
See application file for complete search history.

(56) References Cited

U.S. PATENT DOCUMENTS

| | | | |
|---|---|---|---|
| 9,229,707 B2 * | 1/2016 | Borissov | G06F 8/65 |
| 2007/0244905 A1 * | 10/2007 | Ito | G06F 8/65 |
| 2012/0124570 A1 * | 5/2012 | Alberth, Jr. | G06F 8/65 |
| | | | 717/173 |
| 2015/0033351 A1 * | 1/2015 | Oliphant | G06F 21/554 |
| | | | 726/25 |
| 2019/0026099 A1 * | 1/2019 | Kuchibhotla | G06F 8/71 |
| 2019/0340168 A1 * | 11/2019 | Raman | H04L 67/1008 |
| 2021/0294589 A1 * | 9/2021 | Kaneko | G06F 8/65 |
| 2023/0061613 A1 * | 3/2023 | Cardozo | G06F 8/71 |
| 2023/0195449 A1 * | 6/2023 | Hart | G06F 9/546 |
| | | | 717/172 |

FOREIGN PATENT DOCUMENTS

KR   102125260 B1 *  9/2018  ........... G06F 9/5072

* cited by examiner

*Primary Examiner* — Daxin Wu
(74) *Attorney, Agent, or Firm* — Schwegman Lundberg & Woessner, P.A.

(57) ABSTRACT

A method for upgrading computing devices in a distributed computing environment is provided. The method includes receiving first and second rollout requests for a cluster relating to operational actions for computing devices associated with the cluster. A rollout status for the cluster is determined and the rollout requests are simultaneously performed on the cluster where the operational actions are simultaneously performed on the computing devices associated with the cluster. In addition, a rollout status is updated based on simultaneously performing the rollout requests for the cluster.

20 Claims, 8 Drawing Sheets under disparate geographical locations without direct active management by the user. Examples of functions that storage platforms 106A and 106B can perform can include secure data storage, running internet applications, and providing analytical performance metrics. Storage platforms 106A and 106B can provide these functions while allowing for scalability and providing redundancy to minimize the risk of data loss.

AUTOMATED UPGRADE IN DISTRIBUTED COMPUTING ENVIRONMENTS

TECHNICAL FIELD

Examples relate generally to distributed computing environments and, more particularly, but not by way of limitation, to sending upgrades in distributed computing environments.

BACKGROUND

Cloud-computing systems have grown in popularity as a method of providing computer implemented resources. In cloud computing environments, a data center associated with a cloud provider can provide the computer implemented resources, such as data storage, computing resources, software, intelligence, or analytics, at a location remote from a computing device associated with a user. The data center can provide physical or virtual servers, which can provide the data storage, computing resources, software, intelligence, or analytics for access by the user via their computing device. Further examples can include backup and recovery services, social media, multimedia games, chat applications, and the like.

There can be numerous instances of the computing implemented resources stored throughout physical or virtual servers maintained by the data center. Furthermore, disparate data centers can maintain the same computer implemented resources. In the example of multimedia games, thousands of instances of the multimedia games can be maintained by numerous data centers. A framework can be implemented that allows end-users the ability to access and use the computer implemented resources provided by the cloud-computing systems. The framework can extend throughout the disparate data centers that maintain the same computer implemented resources. Oftentimes, the framework may require updating for various reasons, such as installing a patch or addressing security concerns where the update would need to be made to all the computer implemented resources. However, ensuring that all instances of the computer resources have been updated can be resource intensive. Moreover, it can be difficult to discern between what resources have been updated and what resources have not been updated, thereby further straining an updating process.

BRIEF DESCRIPTION OF THE DRAWINGS

Various ones of the appended drawings merely illustrate example examples of the present disclosure and should not be considered as limiting its scope.

DETAILED DESCRIPTION

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Examples relate to systems and methods for coordinating simultaneous rollouts that can correspond to operational updates for computing devices associated with a cluster. A plurality of users can be associated with a plurality of rollout requests. In examples, a first user of the plurality of users can submit a first rollout request and a second user of the plurality of users can submit a second rollout request. A rollout status for different clusters having computing devices associated therewith can be determined. The rollout status of the different clusters can be updated based on the first and second rollouts being performed on the clusters. In some examples, the rollout status can be continuously monitored with a feedback loop. The feedback loop can monitor the update status of the clusters where the rollout status can reflect that a first cluster has received only the first update, a second cluster has received only the second update, and a third cluster has received both the first update and the second update. In examples, the first and second rollouts can be simultaneously implemented, thereby reducing the time and resources associated with ensuring that computing devices for a cluster are up to date.

Figure 1:
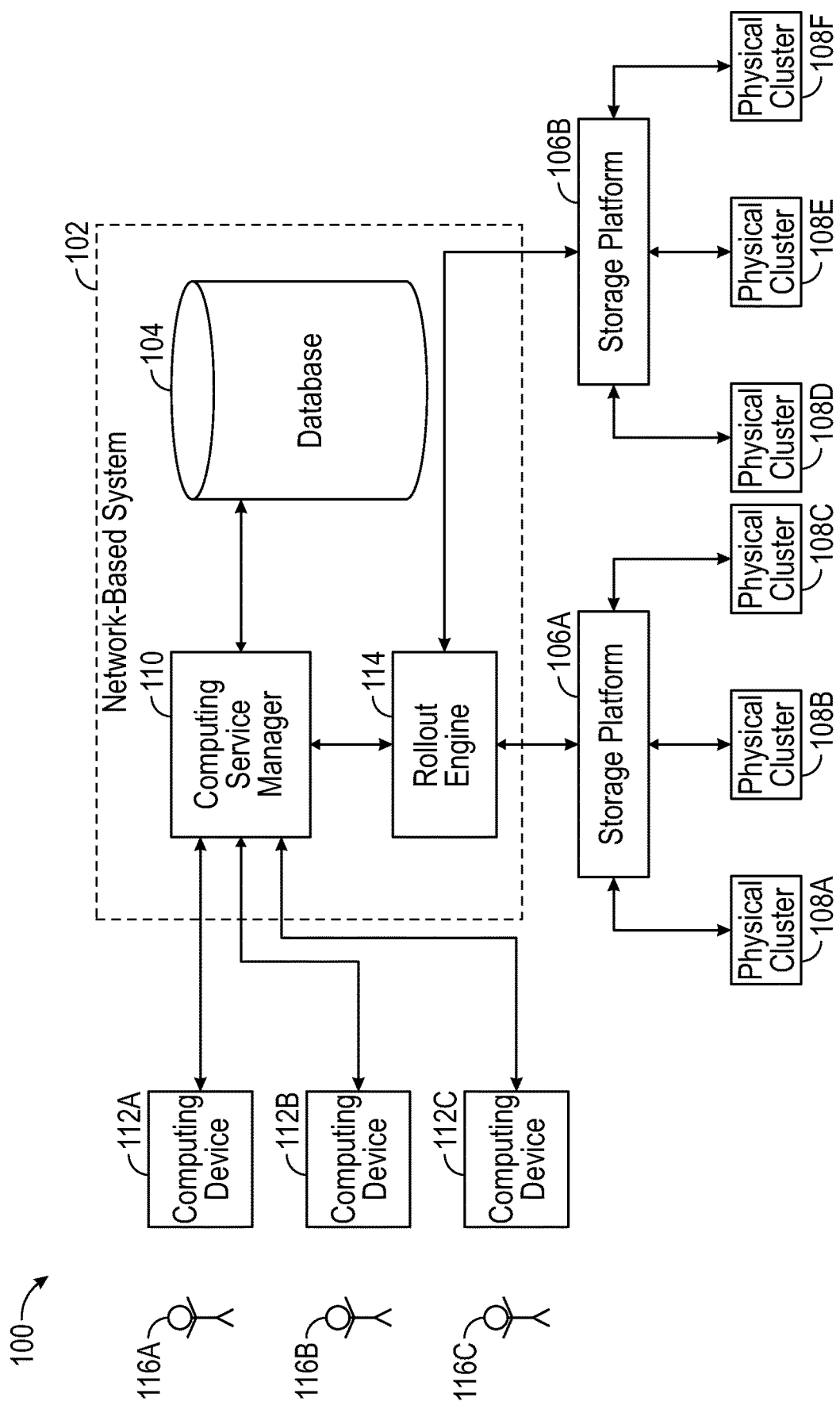
FIG. 1 illustrates a computing environment having a network based system associated with physical clusters, according to some examples.

Now making reference to FIG. 1, a computing environment 100 is shown in which examples can operate. The environment 100 can include a network-based system 102 that can host and provide data reporting and analysis. The network-based system 102 can include a database 104, which can store data associated with the computing environment 100. The database 104 can store data pertaining to various functions and aspects associated with the network-based system 102. For example, the database 104 can include a summary of data stored in remote data storage systems, such as storage platforms 106A and 106B. Furthermore, the database 104 can include information regarding how data is organized in the storage platforms 106A and 106B and local caches.

In examples, the storage platforms 106A and 106B can be associated with physical clusters 108A-108F and store data associated with the physical clusters 108A-108F. Examples of the storage platforms 106A and 106B that can be used to provide this functionality can include Amazon Web Services™ (AWS™) Microsoft Azure Blob Storage™, Google Cloud Storage™, or the like. The storage platforms 106A and 106B can also include a plurality of computing devices. Furthermore, the storage platforms 106A and 106B can provide various on-demand computer system resources, such as data storage and computing power for devices associated with the computing environment 100. It should be noted that while only two storage platforms, such as the storage platforms 106A and 106B, are shown, any number of storage platforms can be used in accordance with examples.

The network-based system 102 can also be used for the analysis and the reporting of data gleaned from disparate entities, such as the physical clusters 108A-108F. Now making reference to FIG. 2, an example of an architecture associated with the physical cluster 108A is illustrated. It should be noted that while an architecture is shown for the physical cluster 108A, the same description is applicable to each of the physical clusters 108B-108F such that each of the physical clusters 108B-108F can have an architecture similar to that described with reference to FIG. 2. In examples, the physical cluster 108A can be a Kubernetes cluster that utilizes a container orchestration platform to manage applications that are distributed and containerized. Kubernetes is a container management system that allows for the deployment of web applications, batch jobs, and databases via a unified application programming interface (API).

Figure 2:
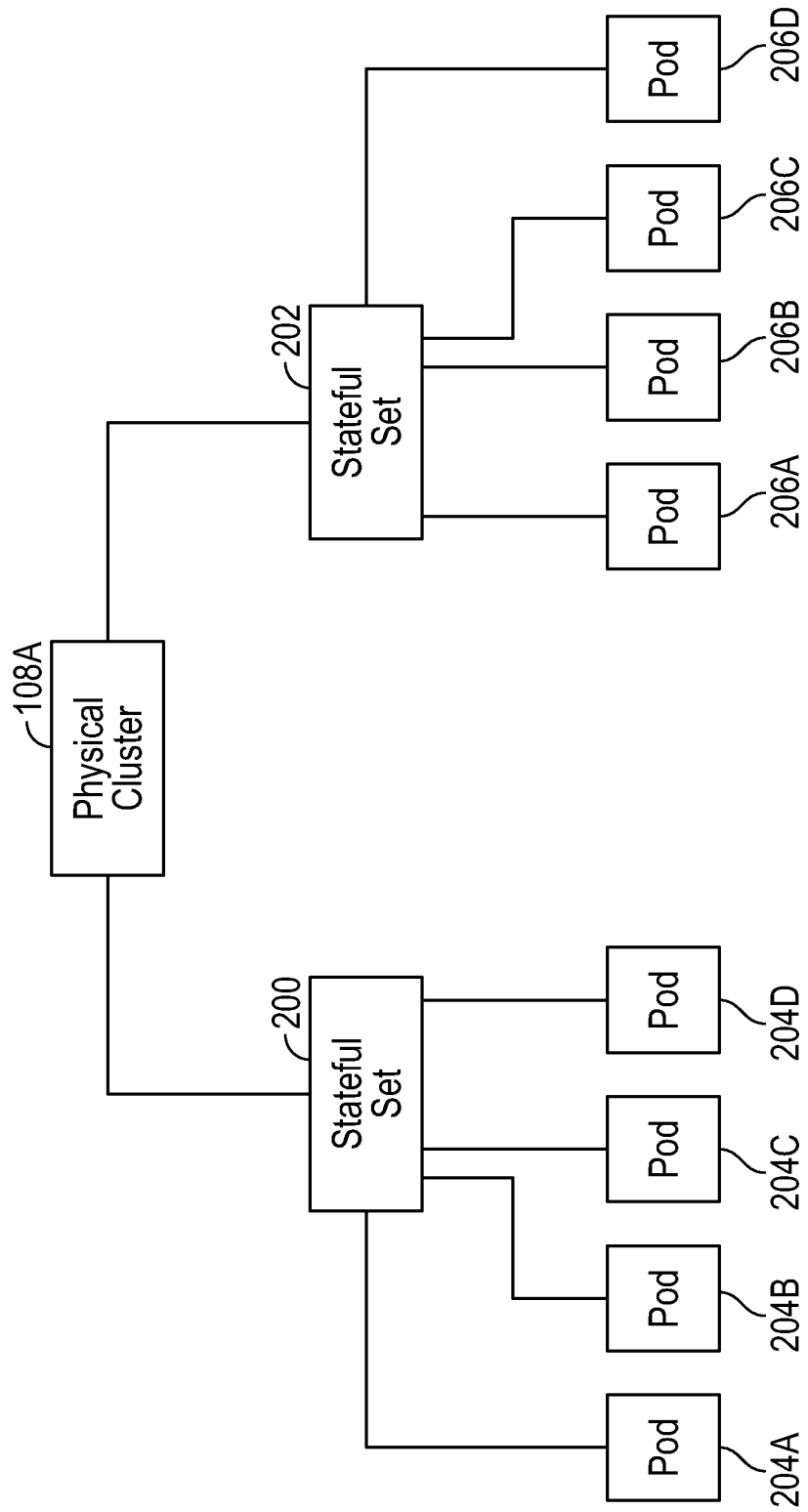
FIG. 2 is an architecture of a physical cluster in the computing environment of FIG. 1, according to some examples.

As shown with reference to FIG. 2, the physical cluster 108A can include stateful sets 200 and 202. In an example, the stateful set 200 can be associated with pods 204A-204D and the stateful set 202 can be associated with pods 206A-206D. The stateful sets 200 and 202 can manage and maintain the respective pods 204A-204D and 206A-206D. The pods 204A-204D and 206A-206D can be a group of one or more containers that can share storage resources along with network resources. The pods 204A-204D and 206A-206D can be any type of computing device, as described herein. Each of the pods 204A-204D and 206A-206D can include several components. To further illustrate, each of the pods 204A-204D and 206A-206D can include an ordinal, stable storage, and a stable network identity. Moreover, each of the pods 204A-204D and 206A-206D can represent an application instance that can run an application within the physical cluster 108A. Examples of an application instance that each of the pods 204A-204D and 206A-206D can run can include Apache Kafka™, Kafka™ structured query language (KSQL), SchemaRegistry, Connect, or the like. In examples, each of the pods 204A-204D and 206A-206D can have their own lifecycle and one of the following states: SETUP, RUN, DISABLED, or DELETED. Moreover, when all the pods 204A-204D are in a RUN state, the stateful set 200 is fully available. Similarly, when all the pods 206A-206D are in a RUN state, the stateful set 202 is fully available.

Each of the stateful sets 200 and 202 can add labels to each of the pods 204A-204D and 206A-206D associated with the stateful sets 200 and 202. In examples, the labels can enable a user associated with the stateful sets 200 and 202 to attach a service to each of the pods 204A-204D and 206A-206D. In examples, each of the stateful sets 200 and 202 can include an ordinal index that assigns the ordinals assigned to the pods 204A-204D and 206A-206D. Furthermore, the stateful sets 200 and 202 can include hostnames, headless services, a domain, and a DNS subdomain associated with the stable network identities of the pods 204A-204D and 206A-206D.

In examples, the physical cluster 108A can implement Kubernete object resource types to support an incremental change notification feed, such as a watch. Kubernete objects implemented by the physical cluster 108A can include a resourceVersion field that represents what version of an application is being used by each of the pods 204A-204D and 206A-206D. Thus, in examples where the pods 204A-204D and 206A-206D run one of Apache Kafka™, Kafka™ KSQL, SchemaRegistry, Connect, or the like, a version of one of these applications being run by the pods 204A-204D and 206A-206D can be reflected in the resourceVersion field. Furthermore, any change to the application being run by the pods 204A-204D and 206A-206D, such as a create, a delete, an update, a version type, or the like, can be reflected in the resourceVersion field. In examples, the data in the resourceVersion field can be uploaded to one of the storage platforms 106A or 106B.

Returning attention to FIG. 1 and the computing environment 100, the network-based system 102 can include a computing service manager 110, which can coordinate and manage operations of the network-based system 102. In addition, the computing service manager 110 can manage computing services that provide computing resources for the network-based system 102. Moreover, the computing service manager 110 can be in communication with computing devices 112A-112C. As mentioned above, the pods 204A-204D and 206A-206D can run an application, such as Apache Kafka™, KSQL, SchemaRegistry, Connect, or the like. In examples, users 116A-116C associated with the computing devices 112A-112C can determine that applications run by the pods 204A-204D and 206A-206D require upgrading. The users 116A-116C can indicate to the computing service manager 110 that applications run by the pods 204A-204D and 206A-206D should be upgraded. Furthermore, the users 116A-116C can provide rollout plans for the upgrades to the applications being run by the pods 204A-204D and 206A-206D to the computing service manager 110.

In examples, the network-based system 102 can include a rollout engine 114 that can implement rollout plans provided by the users 116A-116C across an entire fleet of clusters associated with the network-based system 102 and managed by the users 116A-116C, such as the physical clusters 108A-108F and the pods 204A-204D and 206A-206D. Throughout this document, reference will be made to the term "entire fleet." It should be noted that a reference to the term "entire fleet" can mean an entire fleet of clusters associated with the network-based system 102 and managed by the users 116A-116C, such as the physical clusters 108A-108F and the pods 204A-204D and 206A-206D. The rollout engine 114 can be configured to provide multiple computing resources that execute various data storage and retrieval tasks. As shown with reference to FIG. 1, the rollout engine 114 can be coupled with the storage platforms 106A and 106B. It should be noted while the rollout engine 114 is shown being coupled to two storage platforms, the rollout engine 114 can be coupled to any number of storage platforms having the functionality of the storage platforms 106A and 106B discussed above.

As noted above, the data in the resourceVersion field is uploaded to one of the storage platforms 106A or 106B where the resourceVersion field can store data related to a version of an application used by pods in a cluster. The version of an application can correspond to a status of the pod. In examples, a feedback loop can be used to determine a status of pods, such as the pods 204A-204D and 206A-206D, based on data, such as data in the resourceVersion fields, uploaded and stored to one of the storage platforms 106A or 106B. In examples, the feedback loop can be implemented by the computing service manager 110, the rollout engine 114, or a combination of the computing service manager 110 and the rollout engine 114. Regardless of the implementation, the feedback loop can continuously access storage platforms, such as the storage platforms 106A and 106B, and pull the data in the resourceVersion field stored at the storage platforms. Moreover, the feedback loop can upload the data pulled from the storage platforms 106A and 106B to the database 104. In examples, the rollout engine 114 can access the pulled data from the database 104 at a later time. Using the version of an application, the feedback loop can be used to determine a status of pods in the entire fleet.

As noted above, applications running on the pods within the clusters 108A-108F, such as the pods 204A-204C and 206A-206C, can be updated. To further illustrate, one of the users 116A-116C may determine that an application run by the entire fleet should be upgraded. In this instance, one of the users 116A-116C can use a user interface 300 to assist with the rollout of the application upgrade, as shown with reference to FIG. 3. Here, the user interface 300 can be presented on one of the devices 112A-112C associated with one of the users 116A-116C requesting that an update be performed. In examples, the user interface 300 can include a rollout plan 302 that can include a rollout plan identification 304, an instance type 306, and an operation 308. Furthermore, the user interface 300 can include a max inflight upgrades 310 and an error budget 312. In examples, the rollout plan identification 304 can correspond to a name for a rollout requested by one of the users 116A-116C.

The operation 308 can correspond to the operational action or an upgrade or both to be performed on the pods of the physical clusters 108A-108F, such as the pods 204A-204D and 206A-206D of the physical cluster 108A. Examples of operational actions that can be performed can include updating a version of an application operating on the pods of the clusters 108A-108F, improving a messaging queue functionality of the computing devices associated with the pods of the clusters 108A-108F, replicating data for pods of the clusters 108A-108F, or the distribution of replicated data for the pods of the clusters 108A-108F. Other upgrades that can be performed can include updating a configuration (such as CPU, RAM, Disk sizes, permissions) of an application operating on the pods of the clusters 108A-108F, and restarting all pods to a fresh state to recover any clusters that can be out-of-order. Moreover, upgrades can include an image update of an application, a configuration or parameter update of an application, a resource type change (e.g., from one type of disk to another type of disk) of an application, or no change updates only to reset the runtime state of the application.

In examples, the max inflight upgrades 310 can correspond to a maximum number of upgrades that can occur in parallel. In examples, an upgrade associated with the rollout plan 302 can be done in parallel over multiple pods within multiple clusters. The upgrades 310 can specify the maximum number of clusters that can be upgraded in parallel, e.g., at the same time. The error budget 312 can relate to a total number of HealthCheck failures that occur in one upgrade, a total downtime from all pods of any cluster type in any continuous hour or day, a maximum number of upgrades of any pod in a continuous hour or day, or the like.

In addition, the user interface 300 can include a card 314 that can provide additional information relating to the rollout plan 302. For example, the card 314 can list a region 316 within which the rollout plan 302 will be applied. The card 314 can also list a manual approval status 318, a duration 320, an upgrade settings 322, and a validation settings 324. In examples, the manual approval status 318 can relate to whether or not the rollout can automatically proceed. In examples, if manual approval is required, the rollout cannot automatically proceed. If manual approval is required, in order for the rollout to proceed, a user prompts the rollout to proceed. If manual approval is not required, then the rollout can automatically proceed. The duration 320 can relate to how long an upgrade associated with the rollout will take, such as about thirty minutes.

Figure 3:
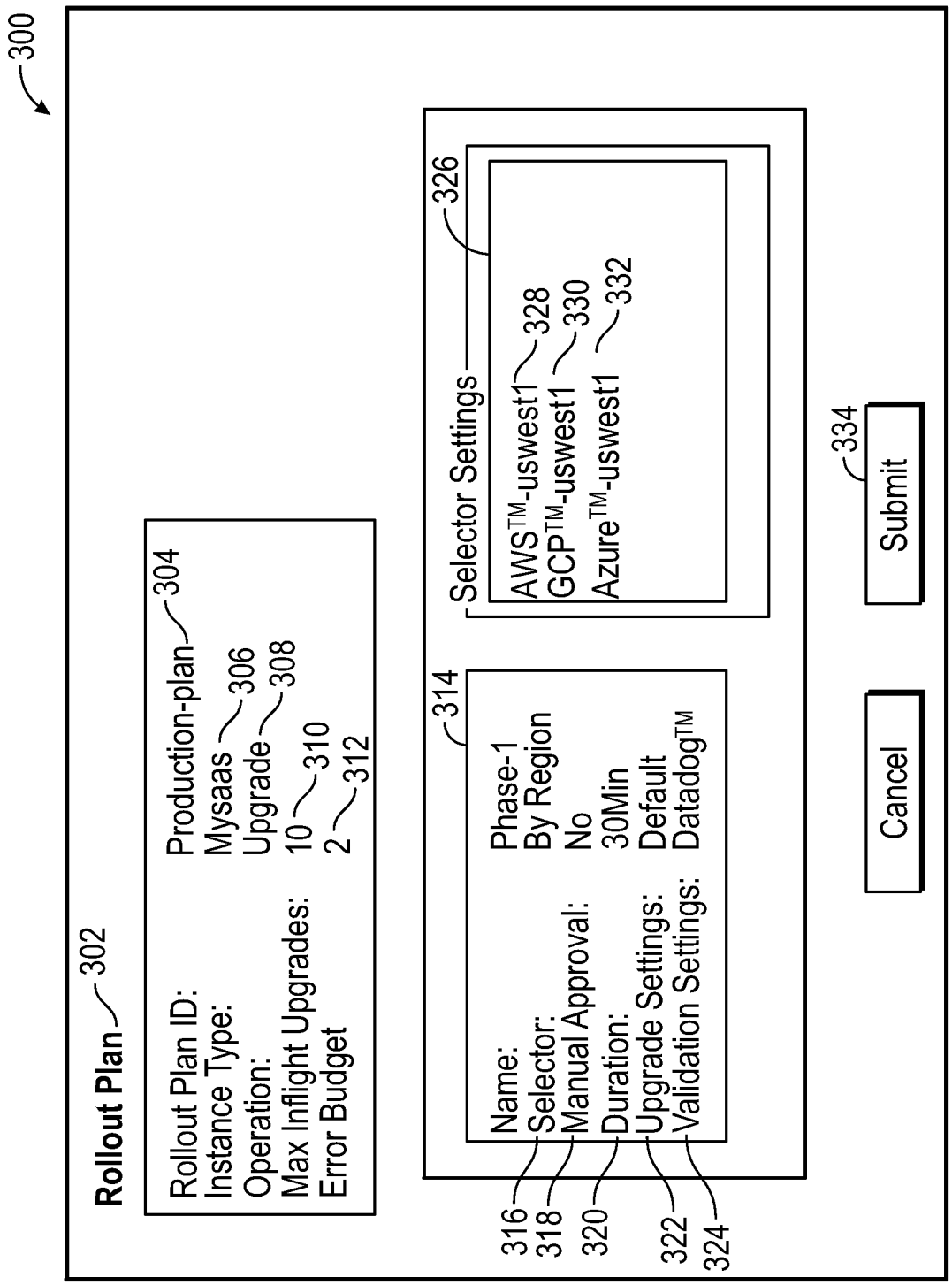
FIG. 3 illustrates a user interface that can be provided to a user to prepare a rollout plan, according to some examples.

The card 314 can also include the upgrade settings 322 and the validation settings 324. In examples, the upgrade settings 322 can relate to settings for the physical clusters having pods that will be upgraded according to the rollout plan. In examples, the update settings can refer to a timeout, a retry frequency, or an error tolerance that a user can set during the upgrade for pods within the cluster that occurs according to the rollout plan. In examples, the upgrade settings 322 can also be set such that the clusters will have default settings during the upgrade to pods within cluster that occurs according to the rollout plan. The validation settings 324 can refer to how the cluster should be validated upon completion of an update. In the example of FIG. 3 and the rollout plan 302, the validation settings 324 can use Datadog™, HealthCheck™, or any other type of software diagnostic tool.

The user interface 300 can also include an input field 326 that lists different regions within which the rollout plan can be executed based on input received at the region 316. As noted above, the card 314 can list a region 316 within which the rollout plan 302 will be applied. Thus, in an example, based on the user indicating that the rollout plan should be implemented by region, the input field 326 can be presented to the user. Via the input field 326, a user can enter various regions in which the rollout plan should be implemented, such as AWS™ servers on the west coast of the United States designated at reference numeral 328, Google Cloud Storage™ servers on the west coast of the United States designated at reference numeral 330, and Microsoft Azure Blob Storage™ servers on the west coast of the United States designated at reference numeral 332.

Figure 4:
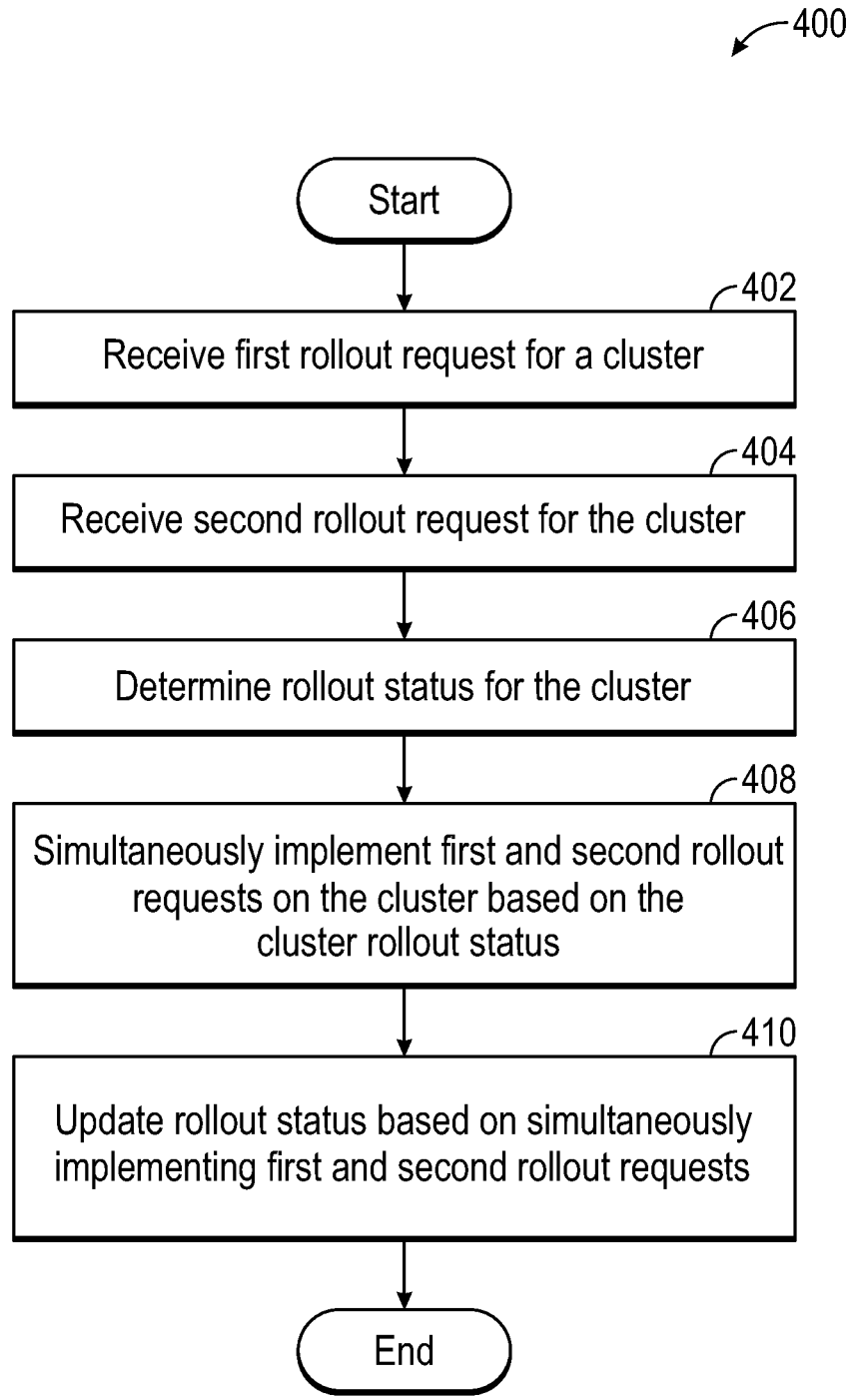
FIG. 4 shows a method for implementing a rollout plan, such as the rollout plan of FIG. 3, according to some examples.

Now making reference to FIG. 4, a method 400 for an automated update rollout across multiple could providers is shown in accordance with an example. Initially, in an operation 402, the method 400 receives a first rollout request for a cluster. During the operation 402, the first user 116A, who can be responsible for a first application running on various clusters in a network based system, such as the physical clusters 108A-108F in the network based system 102, can determine that the first application requires an operational action, such as an upgrade. As such, the first user 116A can provide a first request to the computing service manager 110 of the network-based system 102 that requests that a rollout be performed for the first application on the physical clusters 108A-108F during the operation 402. Examples of operational actions can include improving a messaging queue functionality of the computing devices associated with the pods of the clusters 108A-108F, replicating data for pods of the clusters 108A-108F, or the distribution of replicated data for the pods of the clusters 108A-108F.

As an illustration of the method 400 and the operation 402, herein referred to as the "roll out illustration," reference is made to FIGS. 1 and 3. The first user 116A determines that an application for which the first user 116A is responsible should be upgraded. In the roll out illustration, the upgrade relates to updating a version of an application on the pods of the physical clusters 108A-108F, such as the pods 204A-204D and 206A-206D of the physical cluster 108A. Furthermore, the upgrade by the first user 116A can be considered a first operational action for the computing devices associated with the pods of the physical clusters. More specifically, the first operational action relates to improving the functionality of the computing devices associated with the pods of the physical clusters 108A-108F, such as improving the of the computing devices associated with the pods of the physical clusters 108A-108F. Accordingly, during the operation 402, the first user 116A creates the rollout plan 302 via the user interface 300, as shown with reference to FIG. 3. In the roll out illustration, the first user 116A indicates that the operation 308 should be an upgrade to an application running on the pod. Moreover, the first user 116A indicates that the update should be completed by region and no manual approval is required at 318. In the roll out illustration, the input field 326 corresponding to regions that the first user 116A would like to first implement the rollout plan are various platforms that are on the west coast of the United States, as indicated by AWS™ us-west1 328, GCP™ us-west1 330, and Azure™ us-west1 333. Furthermore, in the roll out illustration, the pods 204A-204D and 206A-206D are associated with the region indicated by AWS™ us-west1 328. Thus, each of the pods 204A-204D and 206A-206D are to receive the upgrade in the rollout request received from the first user 116A.

In the roll out illustration, the first user 116A can also decide that the duration of the of the operational action should take about thirty minutes as designated by the duration 320 and the upgrade settings 322 will reset the setting of the application to be upgraded to a default setting associated with the application. Moreover, the first user 116A can decide that the validation settings 324 will be verified using Datadog™. During the operation 402, the first user 116A can provide the rollout plan as shown with reference to FIG. 3 and the user interface 300 to the computing service manager 110 via the computing device 112A when the first user 116A selects a submit button 334 of the user interface 300.

Returning attention to FIG. 4 and the method 400, the method 400 can perform an operation 404. It should be noted that while the operation 404 is shown as occurring after the operation 402, in accordance with examples, the operation 404 can be performed in parallel, or simultaneously, with the operation 404. During the operation 404, the second user 116B, who can be responsible for a second application running on various clusters in a network based system, such as the physical clusters 108A-108F in the network based system 102, can determine that the second application requires an operational action, such as an upgrade. As such, the second user 116B can provide a second request to the computing service manager 110 of the network-based system 102 that requests that a rollout be performed for the second application on the physical clusters 108A-108F during the operation 404. Examples of operational actions can include improving a messaging queue functionality of the computing devices associated with the pods of the clusters 108A-108F, replicating data for pods of the clusters 108A-108F, or the distribution of replicated data for the pods of the clusters 108A-108F.

Figure 5:
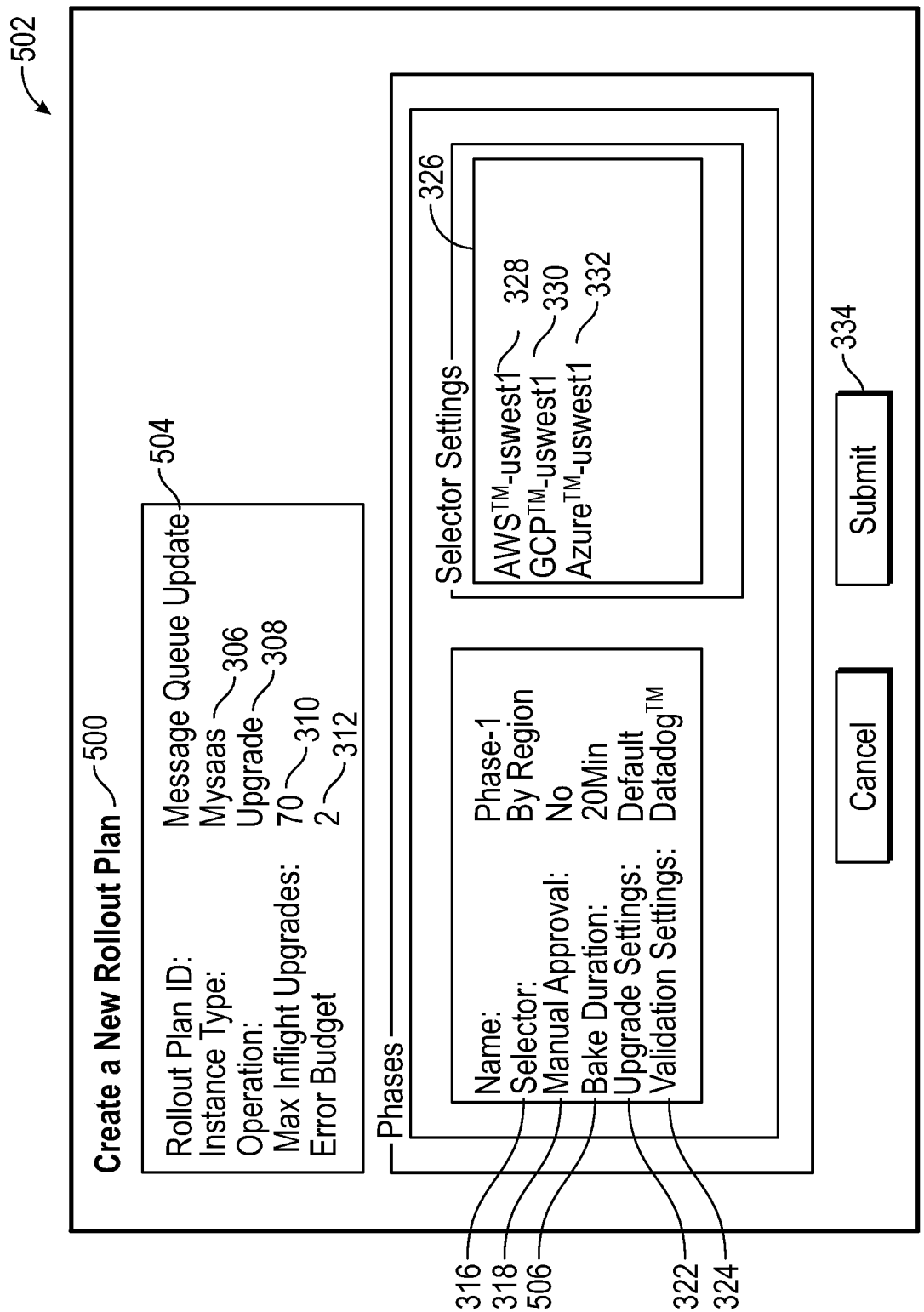
FIG. 5 illustrates a user interface that can be provided to a user to prepare a rollout plan, according to some examples.

Returning to the roll out illustration and FIGS. 1 and 5, the second user 116B determines that an application for which the second user 116B is responsible should be upgraded. In the roll out illustration, the upgrade relates to a messaging queue functionality of the computing devices associated with the pods of the clusters 108A-108F, such as the pods 204A-204D and 206A-206D of the physical cluster 108A. Furthermore, the upgrade by the second user 116B can be considered a second operational action for the computing devices associated with the pods of the physical clusters since the second user 116B has determined that a second operational action is also to be performed for the computing devices associated with the pods of the physical clusters during the operation 402. More specifically, similar to the first operational action, the second operational action can relate to improving the functionality of the computing devices associated with the pods of the physical clusters 108A-108F, such as improving the performance of the computing devices associated with the pods of the physical clusters 108A-108F In the roll out illustration, during the operation 404, the second user 116B creates a rollout plan 500 via a user interface 502, as shown with reference to FIG. 5. In the roll out illustration, the second user 116B indicates that the operation 308 should be an upgrade to the application where the upgrade relates to a message queue update as indicated by a rollout plan identification 504. Additionally, the second user 116B indicates that the update should be completed by region and no manual approval is required at 318. In the roll out illustration, the input fields 326 that list regions that the second user 116B would like to first implement the rollout plan are various platforms that are on the west coast of the United States, as indicated by AWS™ us-west1 328, GCP™ us-west1 330, and Azure™ us-west1 333. Since the pods 204A-204D and 206A-206D are associated with the region indicated by AWS™ us-west1 328, each of the pods 204A-204D and 206A-206D are to receive the upgrade in the rollout request received from the second user 116B.

In the roll out illustration, the second user 116B can also decide that the duration of the operational action should take about twenty minutes as designated by a duration 506 and the upgrade settings 322 will reset the setting of the application to be upgraded to a default setting associated with the application. Additionally, the second user 116B can decide that the validation settings 324 implement DataDog™ to validate the upgrade of the pods within the clusters. During the operation 404, the second user 116B can provide the rollout plan 500 as shown with reference to FIG. 5 and the user interface 502 to the computing service manager 110 via the computing device 112B when the second user 116B selects the submit button 334 of the user interface 502.

Returning attention to FIG. 4 and the method 400, the method 400 can perform an operation 406. It should be noted that while the operation 406 is shown as occurring after the operations 402 and 404, in accordance with examples, the operation 406 can be performed in parallel, or simultaneously, with the operations 402 and 404. Furthermore, the operation 406 can be performed before the operations 402 and 404 or between the operations 402 and 404. Nonetheless, during the operation 404, a rollout status for the clusters is determined.

In examples, the rollout status can relate to the rollout status of the individual pods within each of the clusters 108A-108F. In examples, the rollout status can include one of a key, a value, or a timestamp. In an example, the rollout status can be determined for the pods that are within the region specified in the rollout requests received during the operations 402 and 404. In other examples, the rollout status can relate to the pods of the entire fleet of clusters. As discussed above, in some examples, the physical clusters 108A-108F can implement Kubernete object resource types to support an incremental change notification feed, such as a watch. Also as mentioned above, Kubernete objects implemented by the physical clusters 108A-108F can include a resourceVersion field that represents what version of an application is being used by each of the pods 204A-204D and 206A-206D where the data in the resourceVersion field is stored at the database 104. In examples, the resourceVersion fields can be updated to reflect the upgrades implemented on the pods within the clusters, such as the pods 204A-204D and 206A-206D within the physical cluster 108A, based on the rollout requests received during the operations 402 and 404.

During the operation 406, the rollout engine 114 can access the data relating to the application status of the applications implemented on the pods within each of the clusters 108A-108F, such as the pods 204A-204C and 206A-206C, by accessing either the database 104 or the storage platforms 106A and 106B. In examples, the rollout engine 114 can determine if any of the pods within the clusters 108A-108F, such as the pods 204A-24C and 206A-206C, have already received any of the operational actions described in the rollout requests received during the operations 402 and 404.

Returning to the roll out illustration, during the operation 406, the rollout engine 114 accesses the database 104 and determines a rollout status of the pods associated with various platforms as indicated by AWS™ us-west1 328, GCP™ us-west1 330, and Azure™ us-west1 333. Furthermore, in the roll out illustration, the rollout engine determines that the pods 204A and 204B have received the upgrade in the rollout plan received from the first user 116A while none of the pods 204C, 204D, and 206A-206D have received the upgrade in the rollout plan received from the first user 116A during the operation 406. In addition, the rollout engine 114 determines that the pods 206A and 206B have received the upgrade in the rollout plan received from the second user 116B while none of the pods 204A-204D, 206C, and 206D have received the upgrade in the rollout plan received from the second user 116B during the operation 406 in the roll out illustration.

Turning attention back to FIG. 4 and the method 400, once the rollout status of the individual pods that are to receive the operational action is determined, an operation 408 can be performed. During the operation 408, the first and second rollout requests that were received during the operations 402 and 404 are simultaneously performed. In an example, the rollouts are simultaneously performed according to the rollout requests received during the operations 402 and 404 based on the rollout status of pods within the clusters on which the operational action is to be performed. Thus, if some of the pods in the region for which the rollout is to be performed have already received the upgrade in the rollout request, the pods are not subjected to the upgrade.

Returning to the roll out illustration, during the operation 408, the rollout engine 114 simultaneously implements the rollout plans received from the first user 116A and the second user 116B. During the operation 408, the rollout engine 114 instructs the various platforms that are on the west coast of the United States, as indicated by AWS™ us-west1 328, GCP™ us-west1 330, and Azure™ us-west1 333, to upgrade the pods within clusters of these various platforms. Since the pods 204A-204D and 206A-206D are associated with the region indicated by AWS™ us-west1 328, each of the pods 204A-204D and 206A-206D are to receive the upgrade in the rollout request received from the first user 116A and the second user 116B during the operation 408. However, since the pods 204A and 204B have already received the application upgrade, the pods 204A and 204B will not be updated during the operation 408 in accordance with the rollout request received from the first user 116A. Nevertheless, the pods 204A and 204B will be updated in accordance with the rollout request received from the second user 116B during the operation 408. Moreover, since the pods 206A and 206B have received an update to messaging queue functionality, the pods 206A and 206B will not be updated with the rollout request received from the second user 116B during the operation 408. However, the pods 206A and 206B will be updated in accordance with the rollout request received from the first user 116A during the operation 408.

During the operation 408, each of the rollout requests requested by the first user 116A and the second user 116B can be performed at the same time. In the roll out illustration, at the same time, the pod 204C can be updated in accordance with the rollout request from the first user 116A along with the rollout request from the second user 116B. Similarly, at the same time, the pod 204D can be updated in accordance with the rollout request from the first user 116A along with the rollout request from the second user 116B. In the roll out illustration, the pods 204A and 204B can be updated only with the rollout request received from the second user 116B since the pods 204A and 204B previously received the upgrade in the rollout request received from the first user 116A during the operation 402, as determined by the feedback loop.

In the roll out illustration, during the operation 408, at the same time, the pod 206C can be updated in accordance with the rollout request from the first user 116A along with the rollout request from the second user 116B. Similarly, at the same time, the pod 206D can be updated in accordance with the rollout request from the first user 116A along with the rollout request from the second user 116B. In the roll out illustration, the pods 206A and 206B can be updated only with the rollout request received from the first user 116A since the pods 206A and 206B previously received the upgrade in the rollout request received from the second user 116B during the operation 402, as determined by the feedback loop.

Returning to FIG. 4 and the method 400, when the clusters are updated during the operation 408, a rollout status of the clusters is updated based on simultaneously implementing the first and second requests during an operation 410. In particular, as discussed above, in some examples, physical clusters can implement Kubernete object resource types to support an incremental change notification feed, such as a watch. Also as mentioned above, Kubernete objects implemented by clusters can include the resourceVersion field that represents what version of an application is being used by each of the pods within the clusters where the data in the resourceVersion field is stored at the database 104. During the operation 410, the resourceVersion field associated with each of the pods within the cluster can be updated when each of the pods within the cluster have been updated. In an example, this data can be uploaded and stored at a storage platform, such as one of the storage platforms 106A and 106B. Moreover, the feedback loop can pull the data associated with the resourceVersion field and store this data at the database 104 during the operation 410. Upon completion of the operation 410, the 400 is complete.

In the roll out illustration, during the operation 410, the physical cluster 108A updates resourceVersion fields associated with each of the pods 204A-204D and 206A-206D to reflect that each of these pods have been updated in accordance with the rollout requests received during the operations 402 and 404. The resourceVersion fields are then uploaded to the storage platform 106A where the feedback loop pulls the data from the storage platform 106A for storage at the database 104.

Figure 6:
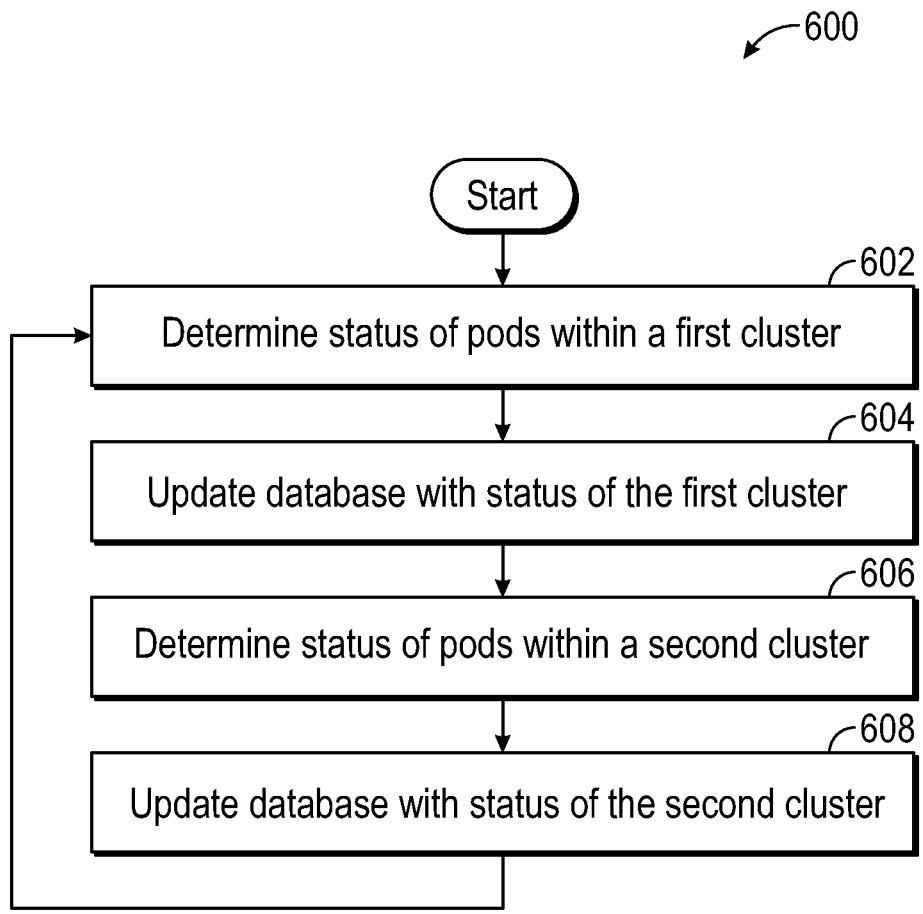
FIG. 6 shows a method for operating a feedback loop that continually updates a status of pods a fleet of clusters, according to some examples.

As noted above, a feedback loop can be used to determine a rollout status of pods within clusters. In further examples, the feedback loop can be a continuous process, such as a background process, that continuously monitors a version status of pods within an entire fleet of clusters and provides this data to the network-based system 102. To further illustrate the concept of a continuous feedback loop, reference is now made to FIG. 6 and a method 600. During an operation 602, a version status of pods within a first cluster is determined.

As an illustration of the method 600, hereinafter referred to as the "status illustration," reference is made to FIGS. 1 and 2. During the operation 602, a feedback loop, implemented by the computing service manager 110 and the rollout engine 114, accesses the storage platform 106A and data associated with the physical clusters 108A-108C relating to a version status of the pods within the physical clusters 108A-108C. The data can be stored in resourceVersion fields uploaded to the storage platform 106A by the physical clusters 108A-108C. In the status illustration, the feedback loop accesses version data from the resourceVersion fields stored at the storage platform 106A in order to determine a status of the pods within the physical clusters 108A-108C. In the status illustration, the version data can reflect that the pods 204A-204D and 206A-206D have all received the upgrade according to the rollout plan 302. The version data can also reflect that the pods 204A-204D, 206A, and 206B have all received the upgrade according to the rollout plan 500. Additionally, the version data can reflect that the pods 206C and 206D did not receive the upgrade according to the rollout plan 500.

Returning to FIG. 6 and the method 600, after the feedback loop determines the status of pods within a first cluster, the method 600 performs an operation 604, where a database is updated with the statuses determined during the operation 602. Returning to the status illustration, during the operation 604, the feedback loop stores the version data pulled from the storage platform 106A at the database 104.

Once the database is updated with the status information during the operation 604, the method 600 performs an operation 606. During the operation 606, a version status of pods within a second cluster is determined. Turning to the status illustration, during the operation 606, the feedback loop, implemented by the computing service manager 110 and the rollout engine 114, accesses the storage platform 106B and data associated with the physical clusters 108D-108F relating to a version status of the pods within the physical clusters 108D-108F. The data can be stored in resourceVersion fields uploaded to the storage platform 106B by the physical clusters 108D-108F. In the status illustration, the feedback loop accesses version data from the resourceVersion fields stored at the storage platform 106B in order to determine a status of the pods within the clusters 108D-108F. In the status illustration, the version data can reflect that the pods within the physical clusters 108D-108F have all received the upgrade according to the rollout plan 302. The version data can also reflect that the pods have all received the upgrade according to the rollout plan 500.

Returning to FIG. 6 and the method 600, after the feedback loop determines the status of pods within a second cluster, the method 600 performs an operation 608, where a database is updated with the statuses determined during the operation 606. Returning to the status illustration, during the operation 608, the feedback loop stores the version data pulled from the storage platform 106B at the database 104. According to the method 600, the database 104 is updated with the rollout status of the clusters when the clusters are updates with a first operational update and a second operational update. In examples, the rollout engine 114 can access the version data from the database 104 when the rollout engine 114 implements rollout requests received the users 112A-112C. Moreover, the rollout engine 114 can access the version data from the database during the operation 406 discussed above in order to determine a rollout status of pods within a cluster. In examples, the feedback loop can continually perform the method 600 such that the database is continually being updated with the status of pods within an entire fleet being managed by the users 112A-112C.

Examples unlock the potential of automated active monitoring during rollouts thereby maintaining the rollout safe and reliable in accordance with various products and applications implemented by devices described herein. Moreover, by implementing features of the network-based system 102, such as the computing service manager 110 and the rollout engine 114, better control is maintain in comparison to delegating to cloud providers. Moreover, in accordance with examples discussed herein, customized strategies can be defined that can depend on static and dynamic attributes of a cluster further enabling safety and feature velocities for various products and applications implemented by devices described herein.

Any of the machines, databases, or devices shown in FIG. 1 may be implemented in a general-purpose computer modified (e.g., configured or programmed) by software to be a special-purpose computer to perform the functions described herein for that machine, database, or device. For example, a computer system able to implement any one or more of the methodologies described herein is discussed below with respect to FIGS. 7 and 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, database, or device, and the functions described herein for any single machine, database, or device may be subdivided among multiple machines, databases, or devices. In examples, communication links between elements of the computing environment 100 are implemented via one or more data communication networks. These data communication networks may utilize any wired or wireless communication protocol and any type of communication medium. In some embodiments, the data communication networks are a combination of two or more data communication networks (or sub-networks) coupled to one another.

Certain embodiments are described herein as including logic or a number of components, modules, or mechanisms. Modules can constitute either software modules (e.g., code embodied on a machine-readable medium) or hardware modules. A "hardware module" is a tangible unit capable of performing certain operations and can be configured or arranged in a certain physical manner. In various example embodiments, one or more computer systems (e.g., a stand-alone computer system, a client computer system, or a server computer system) or one or more hardware modules of a computer system (e.g., a processor or a group of processors) can be configured by software (e.g., an application or application portion) as a hardware module that operates to perform certain operations as described herein.

In some embodiments, a hardware module can be implemented mechanically, electronically, or any suitable combination thereof. For example, a hardware module can include dedicated circuitry or logic that is permanently configured to perform certain operations. For example, a hardware module can be a special-purpose processor, such as a Field-Programmable Gate Array (FPGA) or an Application Specific Integrated Circuit (ASIC). A hardware module may also include programmable logic or circuitry that is temporarily configured by software to perform certain operations. For example, a hardware module can include software executed by a general-purpose processor or other programmable processor. Once configured by such software, hardware modules become specific machines (or specific components of a machine) uniquely tailored to perform the configured functions and are no longer general-purpose processors. It will be appreciated that the decision to implement a hardware module mechanically, in dedicated and permanently configured circuitry, or in temporarily configured circuitry (e.g., configured by software) can be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software accordingly configures a particular processor or processors, for example, to constitute a particular hardware module at one instance of time and to constitute a different hardware module at a different instance of time.

Hardware modules can provide information to, and receive information from, other hardware modules. Accordingly, the described hardware modules can be regarded as being communicatively coupled. Where multiple hardware modules exist contemporaneously, communications can be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module can perform an operation and store the output of that operation in a memory device to which it is communicatively coupled. A further hardware module can then, at a later time, access the memory device to retrieve and process the stored output. Hardware modules can also initiate communications with input or output devices, and can operate on a resource (e.g., a collection of information).

The various operations of example methods described herein can be performed, at least partially, by one or more processors that are temporarily configured (e.g., by software) or permanently configured to perform the relevant operations. Whether temporarily or permanently configured, such processors constitute processor-implemented modules that operate to perform one or more operations or functions described herein. As used herein, "processor-implemented module" refers to a hardware module implemented using one or more processors.

Similarly, the methods described herein can be at least partially processor-implemented, with a particular processor or processors being an example of hardware. For example, at least some of the operations of a method can be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented modules can be located in a single geographic location (e.g., within a home environment, an office environment, or a server farm). In other example embodiments, the processors or processor-implemented modules are distributed across a number of geographic locations.

The modules, methods, applications and so forth described in conjunction with FIGS. 1-6 are implemented in some embodiments in the context of a machine and an associated software architecture. The sections below describe representative software architecture and machine (e.g., hardware) architecture that are suitable for use with the disclosed embodiments.

Software architectures are used in conjunction with hardware architectures to create devices and machines tailored to particular purposes. For example, a particular hardware architecture coupled with a particular software architecture will create a mobile device, such as a mobile phone, tablet device, and the like. A slightly different hardware and software architecture may yield a smart device for use in the "internet of things." While yet another combination produces a server computer for use within a cloud computing architecture. Not all combinations of such software and hardware architectures are presented here as those of skill in the art can readily understand how to implement the inventive subject matter in different contexts from the disclosure contained herein.

Figure 7:
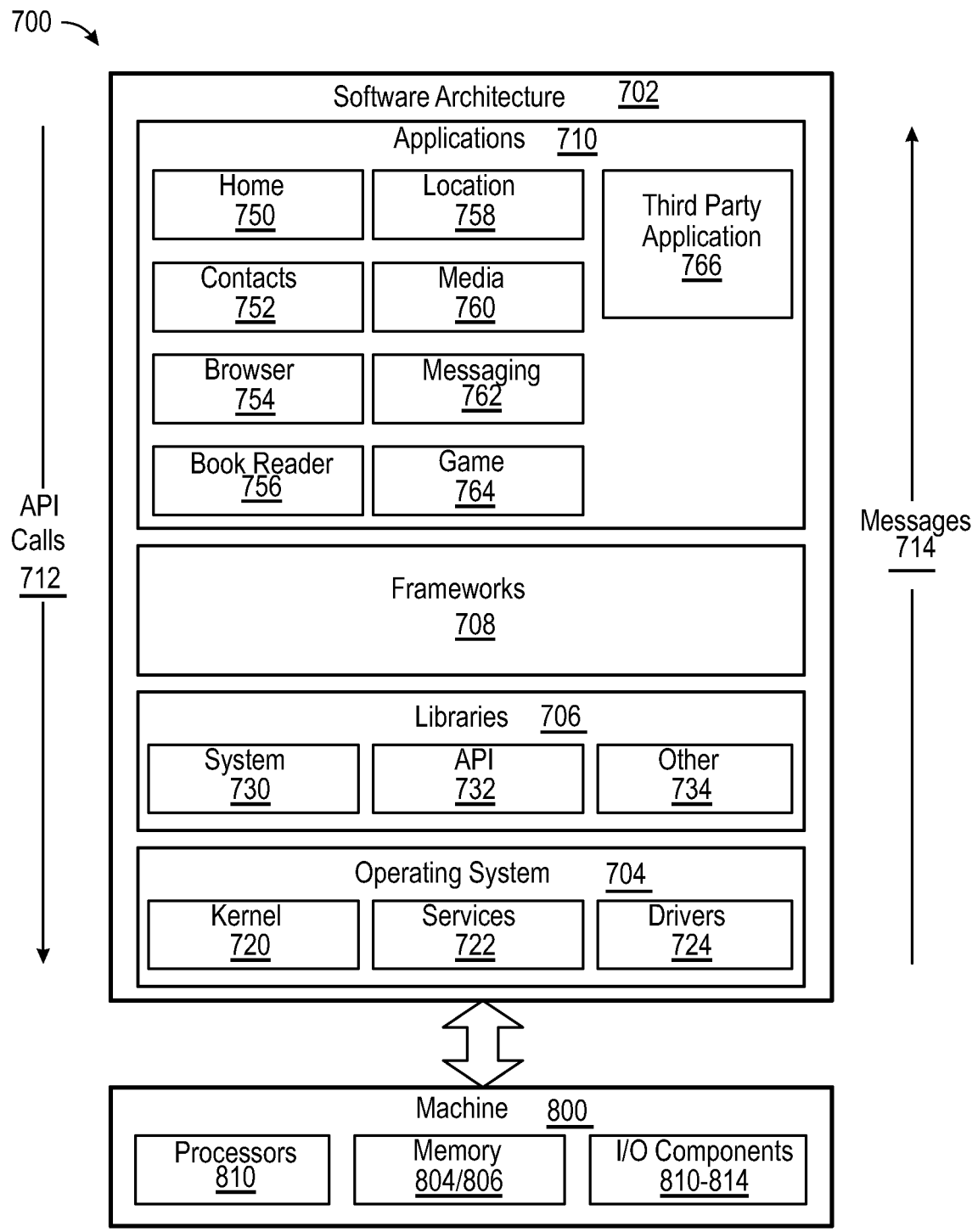
FIG. 7 is a block diagram illustrating architecture of software used to implement displaying an interactive user interface, according to some examples.

FIG. 7 is a block diagram 700 illustrating a software architecture 702, which may be installed on any one or more of the devices described above. FIG. 7 is merely a non-limiting example of a software architecture, and it will be appreciated that many other architectures may be implemented to facilitate the functionality described herein. The software architecture 702 may be implemented by hardware such as a machine 800 of FIG. 8 that includes a processor 802, memory 804 and 806, and I/O components 810-814. In this example, the software architecture 702 may be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, according to some implementations.

In various implementations, the operating system 704 manages hardware resources and provides common services. The operating system 704 includes, for example, a kernel 720, services 722, and drivers 724. The kernel 720 acts as an abstraction layer between the hardware and the other software layers in some implementations. For example, the kernel 720 provides memory management, processor management (e.g., scheduling), component management, networking, and security settings, among other functionality. The services 722 may provide other common services for the other software layers. The drivers 724 may be responsible for controlling or interfacing with the underlying hardware. For instance, the drivers 724 may include display drivers, camera drivers, Bluetooth® drivers, flash memory drivers, serial communication drivers (e.g., Universal Serial Bus (USB) drivers), WiFi® drivers, audio drivers, power management drivers, and so forth.

In some implementations, the libraries 706 provide a low-level common infrastructure that may be utilized by the applications 710. The libraries 706 may include system libraries 730 (e.g., C standard library) that may provide functions such as memory allocation functions, string manipulation functions, mathematic functions, and the like. In addition, the libraries 706 may include API libraries 732 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 706 may also include a wide variety of other libraries 734 to provide many other APIs to the applications 710.

The frameworks 708 provide a high-level common infrastructure that may be utilized by the applications 710, according to some implementations. For example, the frameworks 708 provide various graphic user interface (GUI) functions, high-level resource management, high-level location services, and so forth. The frameworks 708 may provide a broad spectrum of other APIs that may be utilized by the applications 710, some of which may be specific to a particular operating system or platform.

In an example, the applications 710 include a home application 750, a contacts application 752, a browser application 754, a book reader application 756, a location application 758, a media application 760, a messaging application 762, a game application 764, and a broad assortment of other applications such as a third-party application 766. According to some examples, the applications 710 are programs that execute functions defined in the programs. Various programming languages may be employed to create one or more of the applications 710, structured in a variety of manners, such as object-orientated programming languages (e.g., Objective-C, Java, or C++) or procedural programming languages (e.g., C or assembly language). In a specific example, the third-party application 766 (e.g., an application developed using the Android™ or iOS™ software development kit (SDK) by an entity other than the vendor of the particular platform) may be mobile software running on a mobile operating system such as iOS™, Android™ Windows® Phone, or other mobile operating systems. In this example, the third-party application 766 may invoke the API calls 712 provided by the mobile operating system (e.g., the operating system 704) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 8:
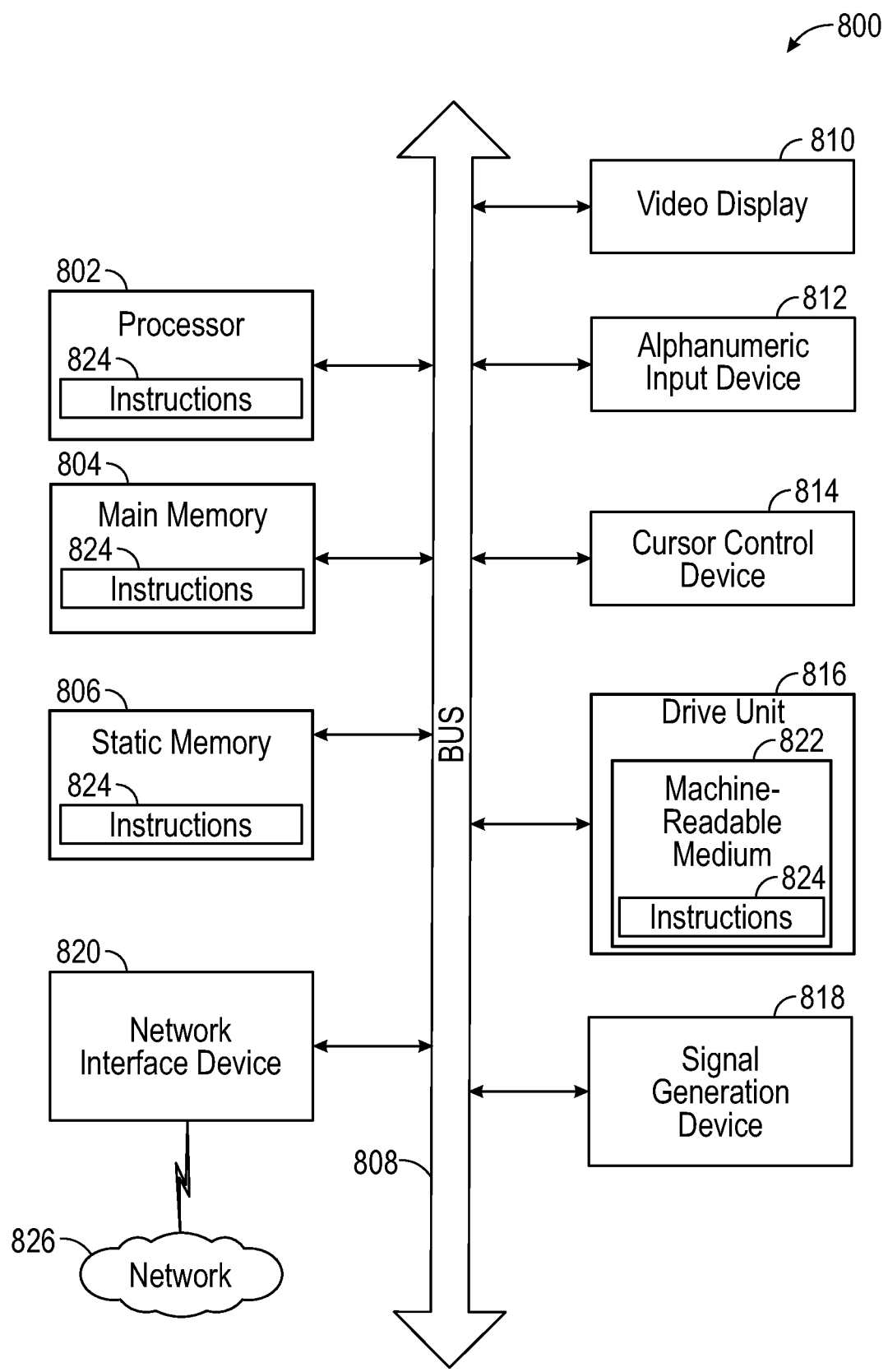
FIG. 8 shows a machine as an example computer system with instructions to cause the machine to implement displaying an interactive user interface, according to some examples.

FIG. 8 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The machine 800, which can be a computer system, includes the processor 802 (e.g., a central processing unit (CPU), a graphics processing unit (GPU) or both), a main memory 804 and a static memory 806, which communicate with each other via a bus 808. The machine 800 may further include a video display unit 810 (e.g., a liquid crystal display (LCD) or a cathode ray tube (CRT)). The machine 800 also includes an alphanumeric input device 812 (e.g., a keyboard), a user interface (UI) navigation device (cursor control device) 814 (e.g., a mouse), a disk drive unit 816, a signal generation device 818 (e.g., a speaker) and a network interface device 820.

The drive unit 816 includes a machine-readable medium 822 on which is stored one or more sets of instructions and data structures (e.g., software) 824 embodying or utilized by any one or more of the methodologies or functions described herein. The instructions 824 may also reside, completely or at least partially, within the main memory 804 and/or within the processor 802 during execution thereof by the machine 800, the main memory 804 and the processor 802 also constituting machine-readable media. Instructions 824 may also reside within the static memory 806.

While the machine-readable medium 822 is shown in an example to be a single medium, the term "machine-readable medium" may include a single medium or multiple media (e.g., a centralized or distributed database, and/or associated caches and servers) that store the one or more instructions or data instructions 824. The term "machine-readable medium" shall also be taken to include any tangible medium that is capable of storing, encoding or carrying instructions 824 for execution by the machine and that cause the machine to perform any one or more of the methodologies of the present invention, or that is capable of storing, encoding or carrying data structures utilized by or associated with such instructions 824. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 824 may further be transmitted or received over a communications network 826 using a transmission medium. The instructions 824 may be transmitted using the network interface device 820 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and WiMax networks). The term "transmission medium" shall be taken to include any intangible medium that is capable of storing, encoding or carrying instructions 824 for execution by the machine, and includes digital or analog communications signals or other intangible media to facilitate communication of such software.

Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

Executable Instructions and Machine Storage Medium

The various memories and/or storage unit may store one or more sets of instructions and data structures (e.g., software) embodying or utilized by any one or more of the methodologies or functions described herein. These instructions, when executed by processor(s), cause various operations to implement the disclosed embodiments.

As used herein, the terms "machine-storage medium," "device-storage medium," "computer-storage medium" mean the same thing and may be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media and/or device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various examples, one or more portions of network, such as the network-based system 102 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. To further illustrate, a network or a portion of a network may include a wireless or cellular network, where a coupling may be a Code Division Multiple Access (CDMA) connection, a Global System for Mobile communications (GSM) connection, or another type of cellular or wireless coupling. In this illustration, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

Instructions may be transmitted or received over a network using a transmission medium via a network interface device and utilizing any one of a number of well-known transfer protocols (e.g., hypertext transfer protocol (HTTP)). Similarly, the instructions may be transmitted or received using a transmission medium via the coupling (e.g., a peer-to-peer coupling) to devices. The terms "transmission medium" and "signal medium" mean the same thing and may be used interchangeably in this disclosure. The terms "transmission medium" and "signal medium" shall be taken to include any intangible medium that is capable of storing, encoding, or carrying instructions for execution by a machine, and includes digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a matter as to encode information in the signal.

Computer-Readable Medium

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A method performed by at least one processor, comprising:
receiving a first rollout request for a cluster, the first rollout request relating to a first operational action for a plurality of computing devices associated with the cluster;
receiving a second rollout request for the cluster, the second rollout request relating to a second operational action for the plurality of computing devices associated with the cluster, the first operational action being different from the second operational action;
determining a rollout status for the cluster, the rollout status indicating that first computing devices of the plurality of computing devices have the first operational action and second computing devices of the plurality of computing devices have the second operational action;
simultaneously implementing the first rollout request and the second rollout request for the cluster where the first operational action and the second operational action are simultaneously performed on the a plurality of computing devices associated with the cluster such that the first computing devices of the plurality of computing devices receive the second operational action, the second computing devices of the plurality of computing devices receive the first operational action and others of the plurality of computing devices receive the first operational action and the second operational action; and
updating the rollout status based on simultaneously implementing the first rollout request and the second rollout request for the cluster.

2. The method of claim 1, the method further comprising continuously monitoring the rollout status for the cluster with a feedback loop.

3. The method of claim 2, wherein the rollout status includes one of a key, a value, or a timestamp.

4. The method of claim 2, the method further comprising updating, with a feedback loop, a database with the rollout status for the cluster when the computing devices associated with the cluster are updated with the first operational action.

5. The method of claim 2, wherein the feedback loop updates a database with the rollout status for the cluster when the computing devices associated with the cluster are updated with the second operational action.

6. The method of claim 2, wherein the cluster includes a plurality of stateful sets, each stateful set of the plurality of stateful sets having a plurality of pods associated therewith and the rollout status relates a rollout status of each pod of the plurality of pods.

7. The method of claim 1, wherein each of the first operational action and the second operational action relate to improving a performance of the computing devices associated with the cluster.

8. The method of claim 1, wherein one of the first operational action and the second operational action relates to one of: improving a messaging queue functionality of the computing devices associated with the cluster, replicating data, a distribution of replicated data, an image update of an application, a configuration or parameter update of an application, or a resource type change.

9. A system, comprising:
at least one processor; and
at least one memory including instructions that, when executed by the at least one processor, cause the system to perform operations comprising:
receiving a first rollout request for a cluster, the first rollout request relating to a first operational action for a plurality of computing devices associated with the cluster;
receiving a second rollout request for the cluster, the second rollout request relating to a second operational action for the plurality of computing devices associated with the cluster, the first operational action being different from the second operational action;
determining a rollout status for the cluster, the rollout status indicating that first computing devices of the plurality of computing devices have the first operational action and second computing devices of the plurality of computing devices have the second operational action;
simultaneously implementing the first rollout request and the second rollout request for the cluster where the first operational action and the second operational action are simultaneously performed on the a plurality of computing devices associated with the cluster such that the first computing devices of the plurality of computing devices receive the second operational action, the second computing devices of the plurality of computing devices receive the first operational action and others of the plurality of computing devices receive the first operational action and the second operational action; and
updating the rollout status based on simultaneously implementing the first rollout request and the second rollout request for the cluster.

10. The device of claim 9, wherein the operations further comprise continuously monitoring the rollout status for the cluster with a feedback loop.

11. The device of claim 10, wherein the operations further comprise updating, with a feedback loop, a database with the rollout status for the cluster when the computing devices associated with the cluster are updated with the first operational action.

12. The device of claim 10, wherein the feedback loop updates a database with the rollout status for the cluster when the computing devices associated with the cluster are updated with the second operational action.

13. The device of claim 10, wherein the cluster includes a plurality of stateful sets, each stateful set of the plurality of stateful sets having a plurality of pods associated therewith and the rollout status relates a rollout status of each pod of the plurality of pods.

14. The device of claim 10, wherein each of the first operational action and the second operational action relate to improving a performance of the computing devices associated with the cluster.

15. A non-transitory machine-readable medium having instructions embodied thereon, the instructions executable by a processor of a machine to perform operations comprising:

receiving a first rollout request for a cluster, the first rollout request relating to a first operational action for a plurality of computing devices associated with the cluster;

receiving a second rollout request for the cluster, the second rollout request relating to a second operational action for the plurality of computing devices associated with the cluster, the first operational action being different from the second operational action;

determining a rollout status for the cluster, the rollout status indicating that first computing devices of the plurality of computing devices have the first operational action and second computing devices of the plurality of computing devices have the second operational action;

simultaneously implementing the first rollout request and the second rollout request for the cluster where the first operational action and the second operational action are simultaneously performed on the a plurality of computing devices associated with the cluster such that the first computing devices of the plurality of computing devices receive the second operational action, the second computing devices of the plurality of computing devices receive the first operational action and others of the plurality of computing devices receive the first operational action and the second operational action; and updating the rollout status based on simultaneously implementing the first rollout request and the second rollout request for the cluster.

16. The non-transitory machine-readable medium of claim 15, wherein the operations further comprise continuously monitoring the rollout status for the cluster with a feedback loop.

17. The non-transitory machine-readable medium of claim 16, wherein the operations further comprise updating, with a feedback loop, a database with the rollout status for the cluster when the computing devices associated with the cluster are updated with the first operational action.

18. The non-transitory machine-readable medium of claim 16, wherein the feedback loop updates a database with the rollout status for the cluster when the computing devices associated with the cluster are updated with the second operational action.

19. The non-transitory machine-readable medium of claim 16, wherein the cluster includes a plurality of stateful sets, each stateful set of the plurality of stateful sets having a plurality of pods associated therewith and the rollout status relates a rollout status of each pod of the plurality of pods.

20. The non-transitory machine-readable medium of claim 16, wherein each of the first operational action and the second operational action relate to improving a performance of the computing devices associated with the cluster.

* * * * *